Figure 1:
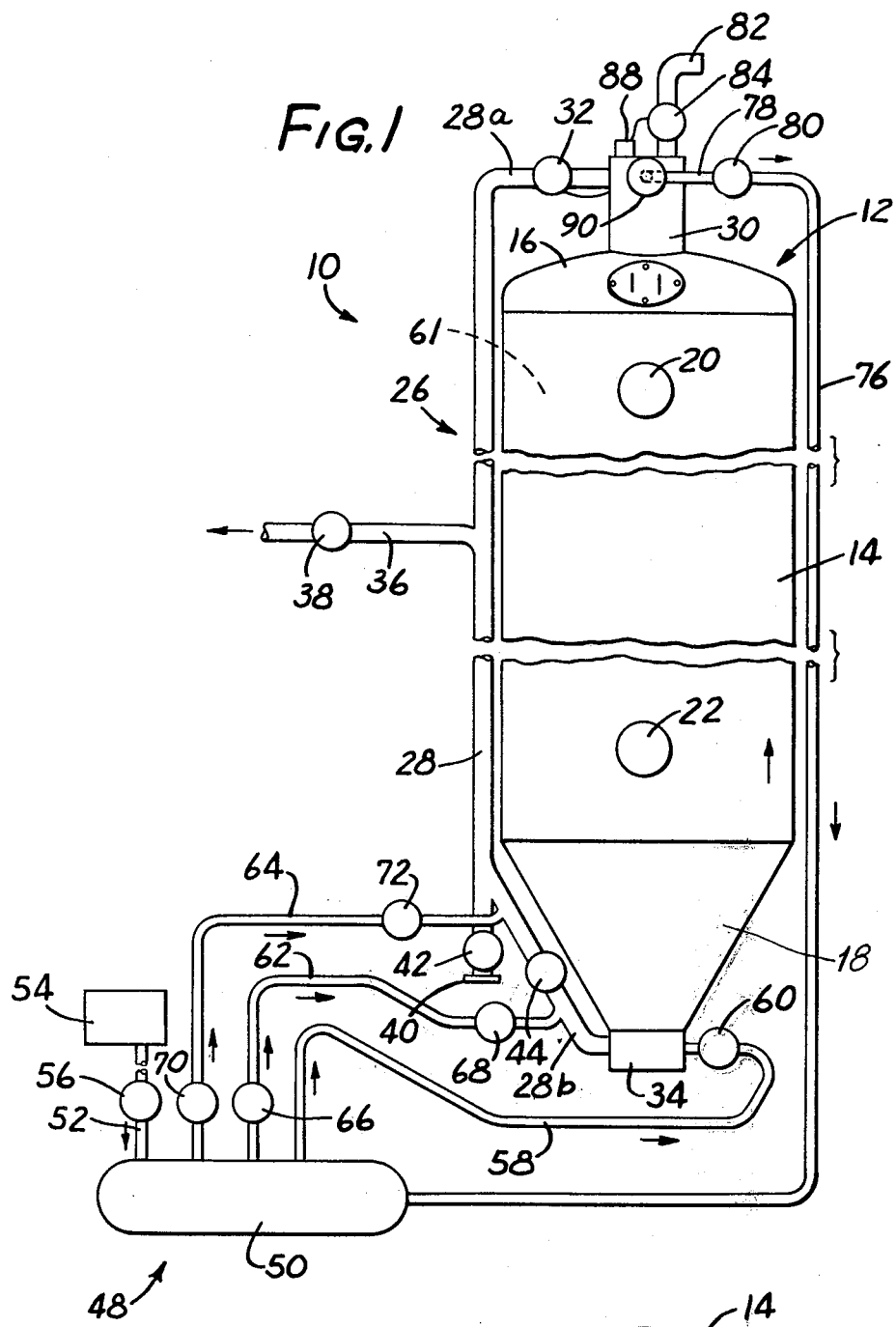

United States Patent [19]
Freeman

[11] 3,905,650
[45] Sept. 16, 1975

[54] MATERIAL TRANSFER SYSTEM
[76] Inventor: Billy P. Freeman, 5412 Parkridge Dr., Knoxville, Tenn. 37914
[22] Filed: Dec. 3, 1973
[21] Appl. No.: 421,212

[52] U.S. Cl. ............... 302/53; 302/35; 302/42; 302/55
[51] Int. Cl. ............................... B65g 53/40
[58] Field of Search ................. 302/35, 42, 53–57

[56] References Cited
UNITED STATES PATENTS

| 749,206 | 1/1904 | Limbert | 302/57 X |
|---|---|---|---|
| 2,792,262 | 5/1957 | Hathorn | 302/53 |
| 3,380,780 | 4/1968 | Allen et al. | 302/42 X |
| 3,671,079 | 6/1972 | Huffaker | 302/55 X |

Primary Examiner—Evon C. Blunk
Assistant Examiner—Jeffrey V. Nase
Attorney, Agent, or Firm—Fitch, Even, Tabin & Luedeka

[57] ABSTRACT

A system for conveying particulate material is disclosed which includes a storage container adapted to receive particulate material therein, a pressure tank adapted to be normally pressurized by an external source of pneumatic pressure and being connected to the storage container for introducing pneumatic pressure into the lower end of the container in a manner to prevent bridging of the particulate material and establish a pressure chamber adjacent the upper end of the container, and conduit means connecting the upper pressure chamber in the storage container to the pressure tank such that the pressure within the pressure tank is supplemented by the pressure from the pressure chamber in the storage container when the pressure within the tank falls below a predetermined value whereby to maintain prolonged pressurized operation of the system. Additional flow conduits interconnect the pressure tank to a discharge conduit from the storage container to assist in pressurized flow of particulate material from the storage container.

9 Claims, 2 Drawing Figures

MATERIAL TRANSFER SYSTEM

The present invention relates generally to material handling systems, and more particularly to a generally closed system for conveying particulate material which employs pneumatic pressure to assist in the discharge of material from a storage container and has novel means for maintaining prolonged pressurization of the system should a normally employed external source of pneumatic pressure become inoperative.

It is known to employ storage containers of substantial size, such as silos, in the storage of particulate material such as cement, fly ash, flour, limestone dust, crushed marble, sand, salt and other similar materials. It is further known to employ closed pneumatic conveyor systems employing one or more sources of pneumatic pressure to assist in maintaining the particulate material fluidized within the storage container and also to assist in passage of the material from the storage container to a discharge line wherefrom the material may be taken for weighing or other processing. Conventionally, particulate material is introduced into the storage container from a pressurized container on a truck, railroad car or the like, or from a non-pressurized truck or railroad car through the employment of external pressure means to introduce the material into the container. Examples of such known material handling systems are disclosed in U.S. Pat. Nos. 3,304,127 and 3,671,079.

The known material handling systems for conveying particulate material exhibit a major disadvantage in that if the source of pneumatic pressure for a system, usually a pneumatic compressor, fails or otherwise becomes inoperative during use, the fluid pressure within the closed system is rapidly reduced to a value below that required to maintain effective and efficient operation of the system. The problem is particularly critical when the system is employed in field use remote from ready sources of repair or replacement parts for the compressor unit.

The present invention is directed to a system for conveying particulate material which overcomes the disadvantages found in the prior art systems.

Accordingly, one of the primary objects of the present invention is to provide a system for conveying particulate material and the like which employs novel means for supplementing the fluid pressure in a pressure tank should the pressure therein fall below a predetermined pressure level effective to maintain efficient operation of the system.

Another object of the present invention is to provide a material handling system particularly adapted for conveying particulate material and the like, which system employs fluid pressure means adapted to supply fluid pressure to a material storage container in a manner to establish a pressure zone or chamber at the upper end of the container which is used to supplement a pneumatic pressure tank for assisting in the pressurized discharge of material from the container when a source of fluid pressure for the pressure tank is deactivated or becomes inoperative.

Another object of the present invention is to provide a material handling system particularly adapted for use in conveying particulate material, which system includes a material storage container, a pneumatic pressure tank normally maintained at a predetermined pressure by an external pressure source, conduit means connecting the pressure tank to the storage container in a manner to establish a pressure zone or chamber in the upper end of the storage container, and conduit means connecting the pressure chamber in the storage container to the pressure tank for supplementing the pneumatic pressure therein when the external pressure source becomes inoperative.

Still another object of the present invention is to provide a system for conveying particulate material as described, which system further includes secondary flow conduits interconnecting the pressure tank to a discharge conduit associated with the storage container for effecting pressurized flow of particulate material from the storage container through the discharge conduit.

Yet another object of the present invention is to provide a material handling apparatus which includes pressure tank means adapted to simultaneously provide pneumatic pressure for discharge of particulate material from a storage container and establish an auxiliary pressure chamber or zone within the container to supplement the pressure tank when the pressure within the tank falls below a predetermined value.

A feature of the present invention lies in the use of the pneumatic pressure which establishes the auxiliary pressure chamber within the storage container to also maintain the particulate material fluidized so as to prevent bridging of the material within the storage container.

Figure 2:
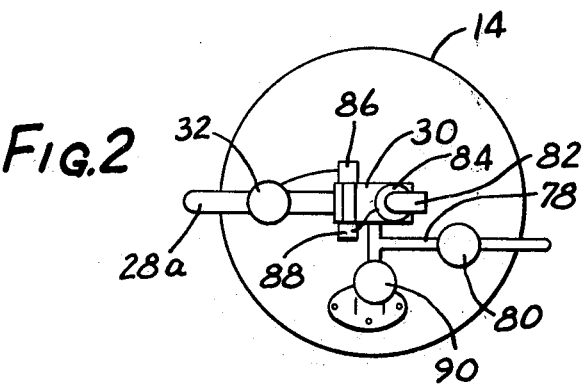

Further objects and advantages of the present invention, together with the organization and manner of operation thereof, will become apparent from the following detailed description of the invention when taken in connection with the accompanying drawing wherein like reference numerals designate like elements throughout the several views, and wherein:

FIG. 1 is a schematic diagram illustrating a particulate material conveying system in accordance with the present invention; and FIG. 2 is a top plan view of the storage container and associated conduits and control valves supported on the upper end of the storage container shown in the system of FIG. 1.

With reference to FIG. 1, a material handling system or apparatus constructed in accordance with the present invention is indicated generally at 10. The material handling apparatus 10 finds particular application in conveying particulate material such as fly ash, cement, sand, salt, crushed lime stone, and marble and the like. The particulate materials are conventionally brought to the material handling system 10 by means of pressurized or non-pressurized commercial carriers such as trucks and railroad container cars. The material handling system 10 is adapted to receive particulate material from a carrier container and convey or transfer the particulate material directly to another location or station, such as a weighing or mixing station, or temporarily store the particulate material prior to transfer to another station removed from the material handling system 10.

The material handling system 10 includes storage container means, indicated generally at 12, which, in the illustrated embodiment, comprises a generally cylindrical storage silo 14 having an upper inlet end 16 and a lower generally conical shaped outlet end 18. The silo container 14 is of a size sufficient to receive a substantial quantity of particulate material therein, and preferably has a pair of indicating gauges 20 and 22 mounted thereon which are adapted to provide an indication of the quantity of particulate material within the storage container. The upper gauge 20 indicates when the container 14 is substantially full while the lower indicator 22 provides an indication of a low volume of particulate material within the silo container.

The material handling system 10 includes first conduit means, indicated generally at 26, comprising a material flow conduit 28 made of a suitable tubular material preferably having a diameter of approximately 5 inches. The flow conduit 28 has an upper end portion 28a which is connected to the upper inlet end 16 of the silo storage container 14 through a generally rectangularly shaped receiver box 30 which provides communication between the interior of the tubular conduit 28 and the inner chamber of the container 14. A power operated control valve 32 of conventional design is provided in the upper end 28a of the flow conduit 28 and is adapted to be selectively opened and closed to control flow of material from the flow conduit 28 into the upper end of the storage container 14, as will become more apparent hereinbelow.

The material flow conduit 28 includes a lower end portion 28b which is connected to a generally cylindrical end portion 34 of the storage container 14 disposed at the lower end of the conical portion 18. The lower end 28b of the flow conduit 28 communicates directly with the interior of the storage container 14 through the lower end portion 34 thereof and is adapted to receive particulate material from the storage container for conveying it through the flow conduit 28 to a station for weighing or otherwise processing or loading the particulate material for subsequent use. To this end, the flow conduit 28 has a tubular discharge conduit portion 36 through which particulate material from the storage container 14 may be conveyed. A power operated control valve 38 of known design is connected in the discharge conduit 36 and is selectively operable between open and closed positions to control the flow of particulate material through the discharge conduit 36.

The flow conduit 28 further has a depending open end portion 40 which is adapted to be connected to a source of particulate material, such as the container of a transport truck or railroad car as aforenoted, from which particulate material may be received for introduction into the storage container 14 or for transfer directly outwardly through the discharge conduit 36. A manually operable control valve 42 of known design is provided in the flow conduit 28 adjacent the lower open end 40 and is operable between open and closed positions to control upward flow of particulate material through the open end 40 when attached to a source of particulate material, the valve 42 being closed when the conduit end 40 is not connected to a source of particulate material.

A manually operable control valve 44 of conventional construction is connected in the lower end portion 28b of the material flow conduit 28 and is manually operable between open and closed positions to control the flow of particulate material from the storage container 14.

With the storage container 14 and first conduit means 26 thus far described, it can be seen that particulate material from a source external to the system 10 may be introduced into the upper end 16 of the storage container 14 through the lower open end 40 of the material flow conduit 28 with the valves 32 and 42 open and the control valves 38 and 44 closed. When the storage container 14 has been filled to the desired level with particulate material and it is desired to remove particulate material therefrom, the control valves 38 and 44 may be opened while the valves 32 and 42 are closed so that particulate material may be conveyed upwardly through the lower end portion 28b of the material flow conduit 28 and discharged through the discharge conduit portion 36.

To assist in the flow of particulate material upwardly through the material flow conduit 28 when the material is being transferred into the storage container 14 from a non-pressurized source connected to the lower end 40 of the material flow conduit, and to assist in the selective discharge of particulate material from the lower end 34 of the storage container 14 outwardly through the discharge conduit 36, the material handling system 10 includes fluid pressure means, indicated generally at 48. The fluid pressure means 48 includes a fluid pressure tank 50 which, in the described embodiment, comprises a pneumatic pressure tank having an inlet conduit 52 adapted to be connected to a source of pneumatic pressure 54 which may comprise a conventional air compressor. The pneumatic compressor 54 is capable of maintaining the pneumatic pressure within the pressure tank 50 at a predetermined level such as 15 psi. A conventional check valve 56 is connected in the inlet conduit 52 to allow air flow from the compressor 54 into the pressure tank 50 while preventing flow in a direction from the pressure tank to the compressor.

A tubular pneumatic pressure conduit 58 is interconnected between the pressure tank 50 and the lower cylindrical portion 34 of the storage container 14 and is adapted to effect the introduction of pneumatic pressure from the pressure tank into the lower end of the storage container. The pressure conduit 58 preferably has an internal diameter of approximately 1½ inches. A check valve or one-way valve 60 of known design is connected in the flow conduit 58 and allows passage of air under pressure from the pressure tank 50 into the lower end of the storage container 14, while preventing flow of air or particulate material from the storage container toward the pressure tank 50. The pressurized air introduced into the lower end 34 of the storage container 14 through the flow conduit 58 serves, when the control valve 44 is open, to assist in the discharge of material from the container 14. A portion of the pressurized air flow through the conduit 58 will pass upwardly through the particulate material within the storage container 14 and thereby prevent bridging and compacting of the particulate material within the lower end of the storage container.

The pneumatic pressure flow which is introduced into the lower end of the storage container 14 and passes upwardly through the particulate material further establishes an air pressure chamber or zone 61 within the upper end of the storage container 14. It will be appreciated that the pneumatic pressure within the pressure chamber or zone 61 so established in the upper end of the storage container 14 will seek a pressure level substantially equal to the pressure within the pressure tank 50.

When the control valves 38 and 44 are opened to convey particulate material from the storage container 14 outwardly through the discharge conduit 36, the air pressure introduced into the lower end 34 of the storage tank 14 through the pneumatic flow conduit 58 assists the passage of particulate material through the conduit 28 to the discharge conduit portion 36. The air pressure which assists in the outward flow of particulate material from the storage container 14 also serves to prevent clogging of the particulate material within the flow conduit 28.

A pair of pneumatic pressure conduits 62 and 64 are connected between the pressure tank 50 and the lower end 28b of the material flow conduit 28. The conduit 62 is connected to the material conduit 28b to intersect it between the control valve 44 and the lower cylindrical portion 34 of the storage container 14. A conventional manually operable control valve 66 and a one-way check valve 68 of known design are connected in the flow conduit 62 to allow manual control of air pressure from the tank 50 into the material flow conduit 28b while preventing flow of air or particulate material from the conduit 28b toward the pressure tank 50.

The pressure conduit 64 is connected to the material flow conduit 28 downstream from the control valve 44, relative to the storage container 14. The pressure conduit 64 has a manually operable control valve 70 and one-way check valve 72, both of known design, connected therein to allow manual control of pneumatic pressure from the pressure tank 50 into the material flow conduit 28 above the control valve 44 while preventing reverse flow of air pressure or particulate material from the flow conduit 28 toward the pressure tank 50.

When the control valves 38 and 42 open and the control valves 32 and 44 closed, and with the lower end 40 of the flow conduit 28 connected to an external source of particulate material, the pressure tank 50 may be pressurized and the control valve 70 opened to effect the passage of pneumatic pressure into the flow conduit 28 to assist in the passage of particulate material from the source directly outwardly through the conduit 36. Similarly, when the control valves 32 and 42 are closed and the control valves 38 and 44 are opened, opening the control valve 66 will effect the introduction of pneumatic pressure into the lower flow conduit portion 28b to assist in the passage of particulate material from the storage container 14 outwardly through the discharge conduit 36. The latter selective flow of pneumatic pressure through the pressure conduit 62 to assist in the discharge of particulate material from the container 14 is in addition to pressurized air flow through the flow conduit 58.

As noted, when pneumatic pressure is introduced into the lower end 34 of the storage container 14 through the pneumatic pressure conduit 58, a pneumatic pressure chamber or zone is created in the upper end of the storage container 14. To facilitate the establishment of a pressure zone or chamber in the upper end of the storage container 14, the storage container is not completely filled with particulate material thereby leaving a void adjacent the upper end of the storage container. In accordance with the present invention the pressure chamber or zone created within the upper end of the storage container 14 is utilized to supplement the pneumatic pressure within the pressure tank 50 when the pressure therein falls below the predetermined pneumatic pressure level as established by the air compressor 54. The establishment of a supplemental pressure chamber within the upper end of the storage container 14 and its use to supplement the pneumatic pressure within the pressure tank 50 is particularly beneficial when the material handling system 10 is employed in field use and the compressor 54 becomes inoperative. By providing supplemental pneumatic pressure to the pressure tank 50 in accordance with the present invention, the operational efficiency of the material handling system 10 is prolonged, and extended shut-down time for repair or replacement of the external fluid pressure source, i.e. compressor 54, is minimized.

In accordance with the present invention, a pneumatic pressure conduit 76 is connected between the upper end 16 of the storage container 14 and the pressure tank 50 and serves to effect the passage of pneumatic pressure from the pressure chamber established in the upper end of the storage container to the pressure tank when the pressure within the pressure tank falls below the aforenoted predetermined value, such as 15 psi. To this end, the pressure conduit 76 has an upper end portion 78 connected to the receiver box 30 which is in communication with the interior of the storage container 14. A one-way or check valve 80 of known design is connected in the upper end portion 78 of the pressure conduit 76 and serves to allow passage of pneumatic flow through the conduit 76 toward the pressure chamber 50 but prevents pneumatic flow in a reverse direction. The lower end of the pressure conduit 76 is connected directly to the pressure tank 50.

A vent pipe 82 is connected to the upper end of the receiver box 30 and has a conventional power operated control valve 84 connected thereto which is operable to open the interior of the storage container 14 to atmosphere through the pipe 82 during the introduction of particulate material into the storage container.

A pair of electrically operated solenoids 86 and 88 are operatively associated, respectively, with the control valves 32 and 84 and may be connected in a control circuit (not shown) to effect remote operational control of the valves 32 and 84 in a known manner.

A pressure relief valve 90 of conventional design is connected to the upper end 78 of the pressure conduit 76 to provide a safety pressure release for the pressure chamber within the upper end of the storage container 14 should the pressure chamber reach a pressure level above that considered to be within the safe structural limitations of the storage container 14 and pressure conduit 76.

Having thus described a preferred embodiment of the material handling system 10 in accordance with the present invention, its operation will now be briefly reviewed. As aforenoted, particulate material may be introduced into the upper end 16 of the pressure container 14 from an external source through the lower end 40 of the material flow conduit 28 with the control valves 32 and 42 open and the control valves 38 and 44 closed. Alternatively, the valves 32 and 44 may be closed while the valves 38 and 42 are open to effect direct passage of particulate material from the external source outwardly through the discharge conduit 36 to a weighing station or other distribution or processing station.

When it is desired to discharge particulate material from the storage container 14 after filling the storage container to a desired level less than full, the compressor 54 is energized to pressurize the pressure tank 50 to a predetermined pressure level, such as 15 psi. Simultaneously, pneumatic pressure flows into the lower end 34 of the storage container 14 and passes upwardly through the particulate material in the container whereby to maintain the material generally fluidized and prevent bridging, as well as to establish a pressure chamber or zone at the upper end of the storage container 14. The valves 38 and 44 are opened. Thereafter, the pneumatic pressure flow from the pressure tank 50 through the flow conduit 58 into the lower end 34 of the storage container 14 effects the transfer of particulate material from the storage container upwardly through the material flow conduit 28 and outwardly through the discharge conduit 36.

During this period of material transfer from the storage container 14, pneumatic pressure flow from the pressure tank 50 continually passes upwardly through the particulate material in the container to maintain the pressure chamber at the top of the storage container 14 at a pressure level generally equal to the pressure level of the pressure tank 50, as established by the compressor 54. Should the compressor 54 fail or become deactivated during discharge of particulate material from the storage container 14, the pressure within the pressure tank 50 will start to fall to a value below the pressure setting of the compressor 54. At this point, the pneumatic pressure within the pressure chamber at the upper end of the storage container 14 will effect pneumatic flow through the flow conduit 76 into the pressure tank 50 to supplement the pneumatic pressure therein and maintain pneumatic flow through the conduit 58 to effect the continued outward flow of particulate material from the container 14 through the flow conduit 28 and the discharge conduit 36.

By providing an auxiliary pressure chamber or zone within the upper end of the storage container 14 as described, the pneumatic pressure within the chamber will supplement the pneumatic pressure within the pressure tank 50 when the pressure in the tank falls below the predetermined pressure level established by the compressor 54 due to failure or other inoperability of the compressor 54. In this manner, the effective and efficient operation of the material handling system 10 is substantially prolonged.

In one specific embodiment, fly ash contained in a silo having a volume of about 2000 cubic feet (ft.$^3$) was transferred from the silo using pressurized air flow from a pressure tank having a volume of 0.65 ft.$^3$. The pressure tank in the present embodiment was pressurized by a conventional 5 horsepower air compressor to 15 pounds per square inch (psi). This relatively low pressure is obtainable using relatively inexpensive air compressors and also allows the silo to be built to less rigid strength requirements, hence at less cost. The pressurized air from the tank 50 flowed through the conduit 58 and check valve 60 to the generally cylindrical bottom end 34 of the silo. The conduit 58 was of 1½ inches internal diameter. Conduit 28 exiting from the cylindrical portion 34 of the bottom end of the silo was nominally 5 inches in internal diameter. Under these conditions, as little as 5 psi air pressure within the tank 50 was found to be sufficient for effecting transfer of fly ash from the silo through conduit 28 and discharge conduit 36. It will be recognized that the volume of the air tank 50 was limited so that upon inactivation of the air compressor 54, almost immediately the pressure of the air within the tank 50 falls below 15 psi. As disclosed herein, the tank 50 was connected to the pressure chamber 61 above the upper level of the fly ash in the silo by means of a conduit 76. In this embodiment valve 80 was set to open when the pressure differential across it was about ½ psi. Therefore, when the air compressor 54 was inactivated and the pressure within the air tank 50 diminished below about 4½ psi, air from the pneumatic pressure chamber 61 flowed through check valve 80 and conduit 76 to the air tank 50 thereby effectively increasing the volume of the air tank 50 by an amount substantially equal to the volume of the pneumatic pressure chamber 61. In this manner, transfer of fly ash from the silo was continued for a substantial period of time after deactivation of the air compressor. The length of time for which transfer can be extended after compressor shut-down depends upon the quantity of particulate material in the tank, hence the volume of the compression chamber above the particulate material in the silo, at the time of compressor shut-down. In many instances, the extended time period of transfer made possible by the present invention is sufficient to complete the transfer of the desired quantity of particulate material, such as where a batch transfer is in progress at the time the compressor shuts down.

In many operating situations the particulate material is transferred from the silo 14 in batches, e.g. one concrete mixer load of cement at a time. These relatively brief periods of transfer activity during which there is a maximum demand for air flow are commonly separated by periods of inactivity during which there is little or no demand for air flow. It has been found that in such cyclical modes of transfer activity, the present invention permits one to use a relatively low volume capacity and relatively inexpensive air compressor that pressurizes both the pressure tank 50 and the pressure chamber 61 during periods of transfer inactivity to provide relatively large volumes of pressurized air for use during a period of transfer when the volume of air flow demand may exceed the maximum output volume of the air compressor. This, of course, is made possible by reason of the disclosed system in which there is provided means to increase the effective capacity of the air supply means.

While a preferred embodiment of the present invention has been illustrated and described, it will be obvious to those skilled in the art that changes and modifications may be made therein without departing from the invention in its broader aspects. Various features of the invention are set forth in the following claims.

What is claimed is:

1. A system for conveying particulate material, comprising, in combination, container means having an upper inlet and a lower outlet end, said container means being adapted to receive a quantity of particulate material therein, conduit means connected to said inlet end of said container means for selectively introducing particulate material from a source into said container means through said inlet end, discharge conduit means connected to said outlet end of said container means for discharging material from said container means through said outlet end, pressure tank means adapted to be normally pressurized to a predetermined fluid pressure level by a source of fluid pressure, conduit means connecting said pressure tank means to said outlet end of said container means for supplying fluid pressure to said container means in a manner to establish a fluid pressure chamber in the upper end of said container means, conduit means connecting said pressure chamber to said pressure tank means, and means operatively associated with said last mentioned conduit means to allow fluid flow therethrough only in a direction toward said pressure tank means such that fluid pressure from said pressure chamber is introduced into said pressure tank means to supplement the fluid pressure therein when the fluid pressure in said tank means falls below said predetermined fluid pressure level.

2. A system as defined in claim 1 wherein said means operatively associated with said last mentioned conduit means comprises a valve means adapted to prevent fluid flow within said last mentioned conduit means in a direction into said pressure chamber from said pressure tank means but is operative to allow fluid flow from said pressure chamber to said pressure tank means when the pressure within said pressure tank means falls below said predetermined pressure level.

3. A system as defined in claim 1 wherein said pressure tank means is adapted to maintain fluid pressure within said pressure chamber in said container means at a value substantially equal to said predetermined pressure level within said pressure tank means until said source of fluid pressure is de-activated such that the fluid pressure within said pressure tank means falls below said predetermined pressure level whereafter fluid pressure flow from said pressure chamber passes to said pressure tank means in a manner to supplement the fluid pressure therein.

4. A system as defined in claim 1 wherein said conduit means connecting said pressure tank means to said outlet end of said container means is operative to cause fluid flow upwardly within said container means through the particulate material therein in a manner to prevent bridging of the particulate material generally adjacent the lower end of said container means.

5. A system as defined in claim 1 wherein said conduit means connecting said pressure tank means to said outlet end of said container means is adapted to effect fluid flow from said pressure tank means in a manner to assist in the outflow of particulate material from said outlet end of said container means.

6. A system as defined in claim 5 including control valve means operatively associated with said discharge conduit means in a manner to allow selective control of the flow of particulate material from said outlet end of said container means.

7. A system as defined in claim 1 including additional conduit means interconnecting said pressure tank means to said discharge conduit means to provide supplemental fluid pressure flow into said discharge conduit means to assist in passage of particulate material therethrough after the particulate material leaves said outlet end of said container means.

8. A system for conveying particulate material and the like, comprising, in combination, storage container means having an inlet and an outlet and being adapted to contain a quantity of particulate material, means connected to said inlet for introducing particulate material into said container means from a source, pneumatic pressure tank means adapted to be pressurized to a predetermined pressure level by a source of pneumatic pressure, first conduit means connecting said pressure tank means to said storage container means in a manner to effect selective pressurized discharge of material from said outlet of said container means and simultaneously establish an auxiliary pneumatic pressure zone in said container means when said pressure tank is pressurized to said predetermined pressure level, second conduit means directly interconnecting said pressure zone in said container means to said pressure tank means so as to effect pneumatic pressure flow from said auxiliary pressure zone to said pressure tank when the pressure level in said pressure tanks fall below said predetermined level, and means associated with said second conduit means to allow flow therethrough only in the direction toward said pressure tank.

9. A system as defined in claim 8 wherein said outlet of said storage container means is located at the lower end thereof so that particulate material introduced into said container means will be urged toward said outlet by gravity, and wherein said first conduit means is adapted to effect pneumatic flow from said pressure tank means upwardly through particulate material within said container means in a manner to prevent bridging of the material adjacent said outlet.

* * * * *

UNITED STATES PATENT OFFICE
CERTIFICATE OF CORRECTION

Patent No. 3,905,650          Dated September 16, 1975

Inventor(s)   Billy P. Freeman

It is certified that error appears in the above-identified patent and that said Letters Patent are hereby corrected as shown below:

Column 5, line 31, "when" should be -- with --.

Column 8, line 1, after embodiment and before valve,"check" should be inserted.

Column 8, line 5, "4 1/2" should be -- 14 1/2 ---.

Signed and Sealed this twentieth Day of April 1976

[SEAL]

Attest:

RUTH C. MASON
Attesting Officer

C. MARSHALL DANN
Commissioner of Patents and Trademarks